(12) United States Patent
Yamauchi et al.

(10) Patent No.: US 6,256,288 B1
(45) Date of Patent: *Jul. 3, 2001

(54) DISK APPARATUS AND MOTOR THEREFOR

(75) Inventors: Yoshiaki Yamauchi; Takashi Kouno, both of Ibaraki-ken; Shinobu Yoshida, Tsuchiura; Katsutoshi Nii, Hitachi; Noriyuki Kumasaka, Ome; Ikuo Nishida, Ebina; Kyuichiro Nagai, Fujisawa, all of (JP)

(73) Assignee: Hitachi, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/017,225

(22) Filed: Feb. 2, 1998

(30) Foreign Application Priority Data

Feb. 3, 1997 (JP) .................................................. 9-020220

(51) Int. Cl.⁷ .................................................. G11B 19/00

(52) U.S. Cl. ............................................................ 369/263

(58) Field of Search .................. 369/263; 360/98.07, 360/99.08, 99.11, 97.02; 310/51, 67 R, 91, 218; 322/58

(56) References Cited

U.S. PATENT DOCUMENTS

| | | | | |
|---|---|---|---|---|
| 3,941,339 | * | 3/1976 | McCarty | 248/15 |
| 4,152,728 | * | 5/1979 | Camerik | 369/219 |
| 4,833,667 | * | 5/1989 | Castagna et al. | 369/263 |
| 4,965,476 | * | 10/1990 | Lin | 310/51 |
| 5,060,209 | * | 10/1991 | Kobayashi | 369/32 |
| 5,241,229 | * | 8/1993 | Katakura et al. | 310/51 |
| 5,280,208 | * | 1/1994 | Komura et al. | 310/90 |
| 5,334,895 | * | 8/1994 | Morioka et al. | 310/67 R |
| 5,541,462 | * | 7/1996 | Nii et al. | 310/90 |
| 5,737,304 | * | 4/1998 | Soga et al. | 369/247 |
| 5,821,655 | * | 10/1998 | Tokushima et al. | 310/90 |
| 5,930,071 | * | 7/1999 | Back | 360/97.01 |

FOREIGN PATENT DOCUMENTS

| | | |
|---|---|---|
| 0 401 293 A1 | 1/1991 | (EP) . |
| 05342830 | * 6/1992 | (EP) .............. G11B/33/08 |
| 61-022734 | 1/1986 | (JP) . |
| 09308178 | * 11/1997 | (JP) . |
| WO90/13167 | 11/1990 | (WO) . |

OTHER PUBLICATIONS

Japanese Patent Unexamined Publication No. 04–133640 Date: May 1992.

Japanese Utility Model Unexamined Publication No. 05–78157 Date: Oct. 1993.

Japanese Patent Unexamined Publication No. 05–30719 Date: Feb. 1993.

\* cited by examiner

Primary Examiner—David L. Ometz
Assistant Examiner—Angel Castro
(74) Attorney, Agent, or Firm—Antonelli, Terry, Stout & Kraus, LLP

(57) ABSTRACT

The present invention provides a disk apparatus and a motor therefor that require low power consumption and reduce errors during recording or reproduction by damping vibration, preventing the motor from falling toward a head. In a disk apparatus comprising a motor and a head, the motor has a rotating portion and a fixed portion, the rotating portion of the motor has a device for holding a disk, the fixed portion of the motor has a bearing section and a stator section mounted in the disk apparatus via damping members, and the damping members are provided in such a way that one side of these members which is closer to a line joining the motor with the head has a higher rigidity than the other side.

11 Claims, 10 Drawing Sheets

BALL BEARING
(WITHOUT DAMPING MEMBERS)

SLIDING BEARING
(WITHOUT DAMPING MEMBERS)

SLIDING BEARING
(WITH DAMPING MEMBERS)

DISK APPARATUS AND MOTOR THEREFOR

BACKGROUND OF THE INVENTION

The present invention relates to a disk apparatus, and in particular, to a disk apparatus that rotates a disk-like recording medium at a high speed to record and reproduce information on and from the medium, for example, an optical disk apparatus such as a CO-ROM, a DVD-ROM, or a DVD-RAM, as well as a disk apparatus motor.

Conventional disk apparatuses have a supporting protrusion provided on the lowest plate in a stator core and extending toward a bracket body, with the tip of the supporting protrusion fixed to the bracket body using an adhesive, as described in Japanese Patent Unexamined Publication No. 4-133640. Related apparatuses are described in Japanese Utility Model Unexamined Publication No. 5-78157, Japanese Patent Unexamined Publication No. 4-507184 (WO90/13167), and Japanese Patent Unexamined Publication No. 5-30719.

In these conventional disk apparatuses, the rigidity is increased by the supporting protrusion of the stator core and the natural frequencies are thus increased, but no considerations have been given to dampen the vibration, to prevent the motor falling toward the head and to reduce current consumption. Recently, these considerations have been particularly important due to the increased speed of disk apparatuses and the demand for miniaturization and multiple functions.

It is an object of the present invention to provide a disk apparatus and a motor therefor which reduce errors during recording or reproduction by damping vibration and preventing the motor from falling toward the head and which lower power consumption.

SUMMARY OF THE INVENTION

The object can be achieved by providing a disk apparatus comprising a motor for rotating a disk and a head for recording and reproducing data on and from said disk wherein said motor is mounted on said disk apparatus through a damping member.

The object can be achieved by providing a disk apparatus comprising a motor for rotating a disk and a head for recording and reproducing data on and from the disk wherein the motor comprises a rotating portion and a fixed portion, the rotating portion of the motor comprising a rotor, a shaft, and means for holding the disk, the fixed portion of the motor comprising a bearing section in which a bearing is provided in a bearing housing and a stator section in which a stator core having a stator coil is mounted in the bearing housing, the shaft being inserted into and supported by the bearing, the stator section being mounted in the disk apparatus via a damping member.

The above object can be achieved by providing a disk apparatus comprising a motor and a head wherein the motor comprises a rotating portion and a fixed portion, the rotating portion of the motor having means for holding the disk, the fixed portion of the motor having a bearing section and a stator section mounted in the disk apparatus via damping members provided on or near a straight line joining a rotating center of the motor with an objective lens in the head that is used to record and reproduce data on and from the disk.

The above object can be achieved by providing a disk apparatus comprising a motor and a head wherein the motor comprises a rotating portion and a fixed portion, the rotating portion of the motor having means for holding the disk, the fixed portion of the motor having a bearing section and a stator section mounted in the disk apparatus via vibration damping members provided in such a way that one side of these members which is closer to a line joining the motor with the objective lens in the head has a higher rigidity than the other side.

The above object can be achieved by providing a disk apparatus comprising a motor for rotating a disk and a head for recording and reproducing data on and from the disk wherein the motor comprises a rotating portion and a fixed portion, the rotating portion of the motor comprising a rotor, a shaft and means for holding the disk, the fixed portion of the motor comprising a bearing section in which a bearing is provided in a bearing housing and a stator section in which a stator core having a stator coil is mounted in the bearing housing, the shaft being inserted into and supported by the bearing, and wherein legs of a plurality of damping members are interposed between the stator section and the apparatus body so as to be located on a circle centered at a rotating center of the motor, the damping members being provided in proximity to a line joining the rotating center of the motor with an objective lens in the head that is used to record and reproduce data on and from the disk in such a way that the members are symmetrical relative to this line.

The above object can be achieved by providing a disk apparatus comprising a motor for rotating a polycarbonate disk of about 120 mm diameter and a head for recording and reproducing data on and from the disk wherein the motor comprises a rotating portion and a fixed portion, the rotating portion of the motor comprising a rotor, a shaft and means for holding the disk, the fixed portion of the motor comprising a bearing section in which a sliding bearing is provided in a bearing housing and a stator section in which a stator core having a stator coil is mounted in the bearing housing, the shaft being inserted into and supported by the sliding bearing and having an shaft diameter of 1 mm or more and 2.5 mm or less, a gap between the shaft and the sliding bearing being 2 $\mu$m or more and 8 $\mu$m or less.

The above object can be achieved by providing a disk apparatus comprising a spindle motor for rotating a disk and a head for recording and reproducing data on and from the disk wherein the motor comprises a rotating portion and a fixed portion, the rotating portion of the motor comprising a rotor including a multipolar permanent magnet, a shaft and a turn table for holding the disk, the fixed portion of the motor comprising a cylindrical bearing housing, a sliding bearing installed in the bearing housing in such a way that the bearing is divided into two parts positioned up and down, a stator core mounted on an outer circumference of the bearing housing and a stator coil provided in the stator core, a lower end of the bearing housing being mounted on a substrate, the shaft being inserted into and supported by the sliding bearing, a lubricant being interposed between the shaft and sliding bearing in the bearing housing, and wherein a plurality of damping members are interposed between the stator section and the apparatus body so that legs of the damping members are located on a circle centered at a rotating center of the motor, the damping members being provided symmetrically and in proximity to a line joining the rotating center of the motor with an objective lens for recording and reproducing data on and from the disk.

The above object can be achieved by providing a motor for a disk apparatus having a rotating portion and a fixed portion, the rotating portion having means for holding a disk, the fixed portion having a bearing section and a stator section mounted on a substrate via damping members, the damping members being provided in such a way that one side of these members which is closer to a line perpendicular to a rotating shaft of the rotating portion has a higher rigidity than the other side.

The above object can be achieved by providing a motor for a disk apparatus comprising a spindle motor having a rotating portion and a fixed portion, the rotating portion comprising a rotor including a multi-polar permanent magnet, a shaft and a disk, the fixed portion comprising a cylindrical bearing housing, a sliding bearing installed in the bearing housing in such a way that the bearing is divided into two parts positioned up and down, a stator core mounted on an outer circumference of the bearing housing and a stator coil provided in the stator core, a lower end of the bearing housing being mounted on a substrate, the shaft being inserted into and supported by the sliding bearing, a lubricant being interposed between the shaft and sliding bearing in the bearing housing, and wherein a plurality of damping members are interposed between the stator section and the substrate so that legs of the damping members are located on a circle centered at a rotating center of the rotating portion, the damping members being provided symmetrically and in proximity to a line perpendicular to the rotating shaft of the rotating portion.

DESCRIPTION OF THE PREFERRED EMBODIMENTS OF THE INVENTION

The embodiments of the invention are described hereinafter with reference to FIGS. 1A to 14.

Figure 1A:
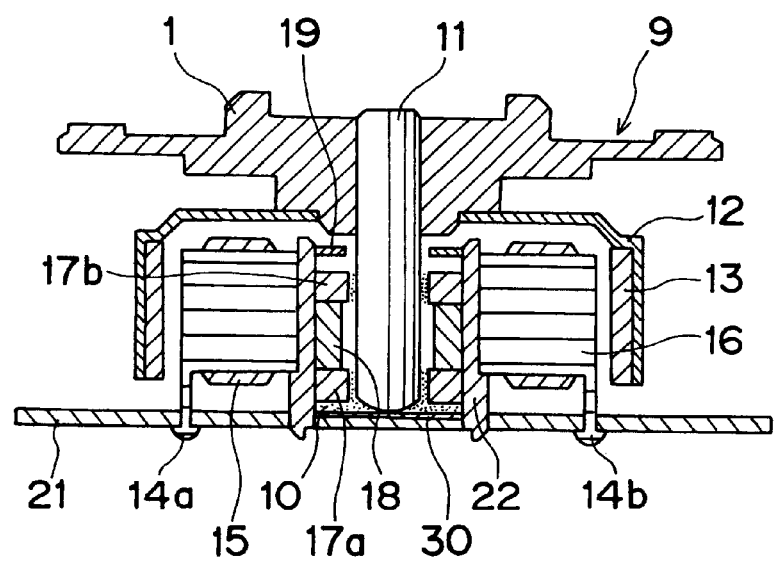
FIGS. 1A and 1B are a vertical cross sectional view and a bottom view of a spindle motor according to the invention.
Figure 1B:
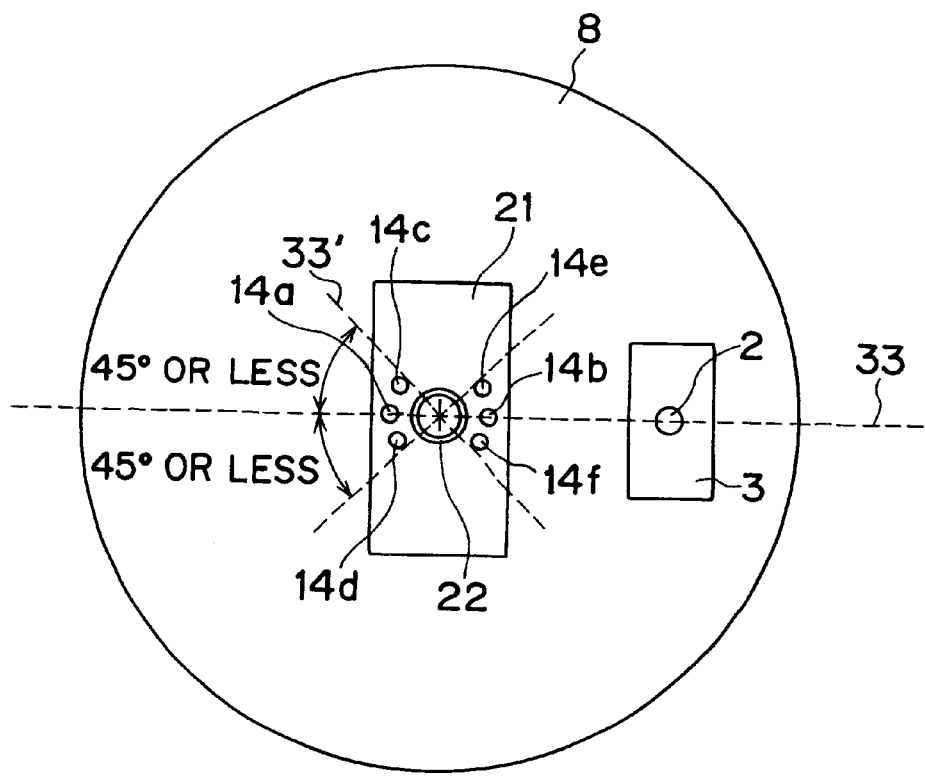

FIG. 1A is a vertical cross sectional view of a spindle motor 9 that is one embodiment of the invention, and FIG. 1B is a bottom view thereof. A fixed portion of the spindle motor 9 comprises a bearing unit and a stator section. The bearing unit comprises a lubricant 10, a sliding bearing 17, a felt metal 18, an oil thrower 19, a bearing housing 22, and a pivot bearing 30. A lower end of the bearing housing 22 is fixed to a stator substrate 21, and its top surface is opened while its bottom surface is closed. The oil thrower 19 is provided in the bearing housing 22 at its upper end. The sliding bearing 17 is installed in the bearing housing 22 and is divided into an upper sliding bearing 17a and a lower sliding bearing 17b. The pivot bearing 30 is provided in the bearing housing 22 at its lower end. The felt metal 18 is disposed between the upper sliding bearing 17a and the lower sliding bearing 17b and adapted to supply the lubricant 10 to the sliding bearing 17. The stator section comprises a stator core 16 mounted on an outer circumference of the bearing housing 22 and a stator coil 15 provided on the stator core 16 for generating magnetic fields.

A rotating portion of the spindle motor 9 comprises a turn table 1, a shaft 11, a rotor 12, and a permanent magnet 13. A lower part of the shaft 11 is inserted into the bearing housing 22 and is rotatably supported by the pivot bearing 30 and the sliding bearing 17. The turn table 1 is mounted on an upper part of the shaft 11 and rotated with the shaft to constitute means for holding a disk 8. The center of a top surface of the rotor 12 is mounted on a bottom surface of the turn table 1, and an outer circumference of the rotor hangs down to constitute a side wall. The permanent magnet 13 is multi-polar and is mounted on an inner surface of the side wall of the rotor 12 so as to face the stator core 16.

Figure 2A:
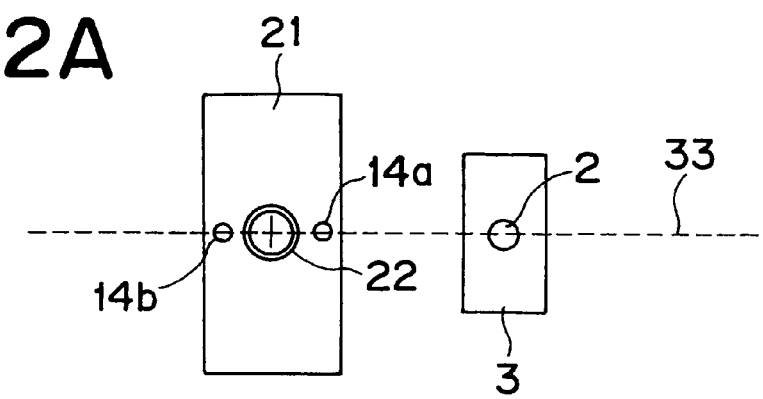
FIGS. 2A to 2C are explanatory views illustrating the mounting positions of damping members in a disk apparatus according to the invention.
Figure 2B:
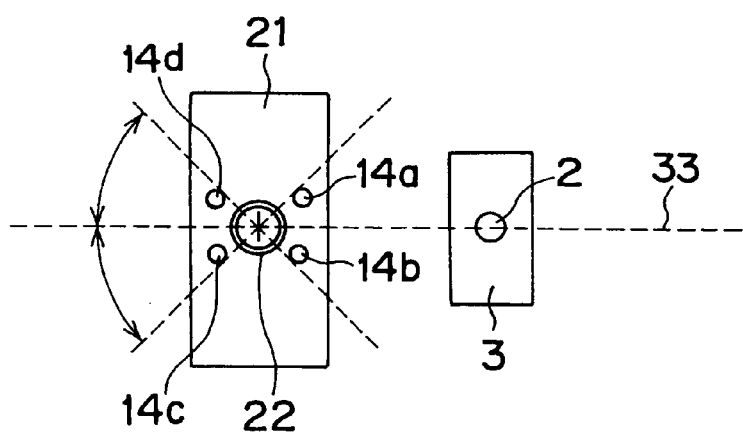
Figure 2C:
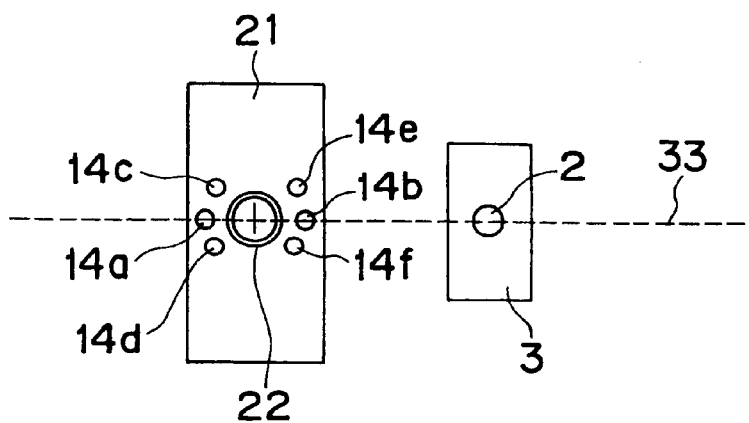

A plurality of damping members 14a to 14f are integrally formed with the core 16 on the bottom surface of the stator core 16. In this embodiment, six damping members 14a to 14f are used. Each of the damping members 14a to 14f is formed of synthetic resin to provide damping action and has a narrow leg extending downward from the stator core 16. A lower end of the leg passes through a hole provided in the stator substrate 21, and is welded and fixed to the stator substrate 21. The legs of the damping members 14a to 14f are positioned on a circle which is located at an outside of the bearing housing 22 and on and near a straight line 33 joining an objective lens 22 constituting part of a head with the center of the shaft 11 of the spindle motor 9 in such a way that the legs are symmetrical relative to the bearing housing 22. The legs are fixed to the stator substrate 21. The legs of the damping members 14a to 14f are positioned so that an angle between the straight line 33 and a straight line 33' joining an outside of the leg located furthest from the straight line 33 with the center of the shaft 11 is 45° or less. The legs of the damping members 14a to 14f may be in number and positions as shown in FIGS. 2A to 2C. The damping members 14a to 14f are structured to have functions for preventing the spindle motor 9 from falling during the vibration mode of the disk 8, shifting natural frequencies that may resonate with, and damping vibration energy. The damping members 14a to 14f also have a function for enabling easy positioning when building the stator section onto the stator substrate 21. The stator substrate 21 constitutes part of the spindle motor 9, but in an incorporated state in the disk apparatus, constitutes part of the apparatus. Thus, the stator substrate 21 may be omitted and a unit holder 4 may have the same functions as the stator substrate.

Figure 3:
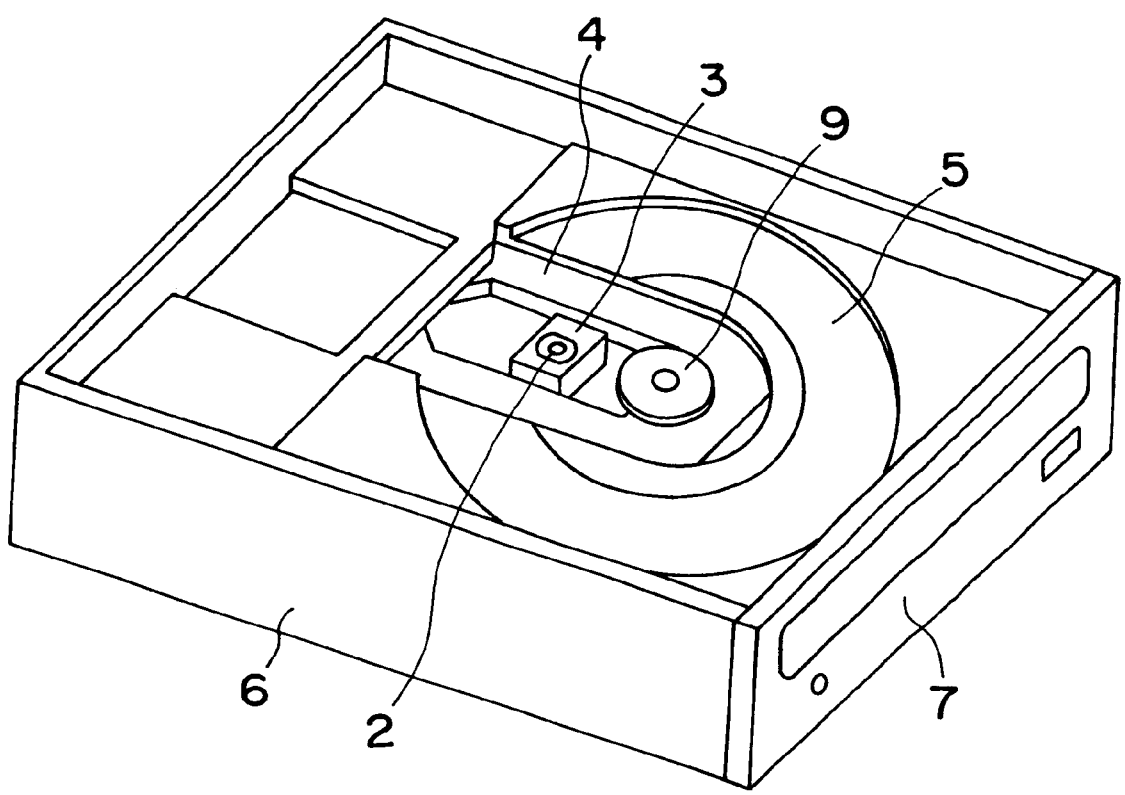
FIG. 3 is a perspective view of an optical disk apparatus according to the invention.

FIG. 3 is a perspective view of an optical disk apparatus (a CD-ROM) that is one embodiment of the invention. The spindle motor 9 and the head comprising the objective lens 2 and an objective fine-adjustment drive device 3 are mounted on the unit holder 4 fixed to a mechanical base 6.

A disk tray 5 on which the disk 8 is mounted is housed in and withdrawn from the apparatus through an opening in a front panel 7.

Figure 4:
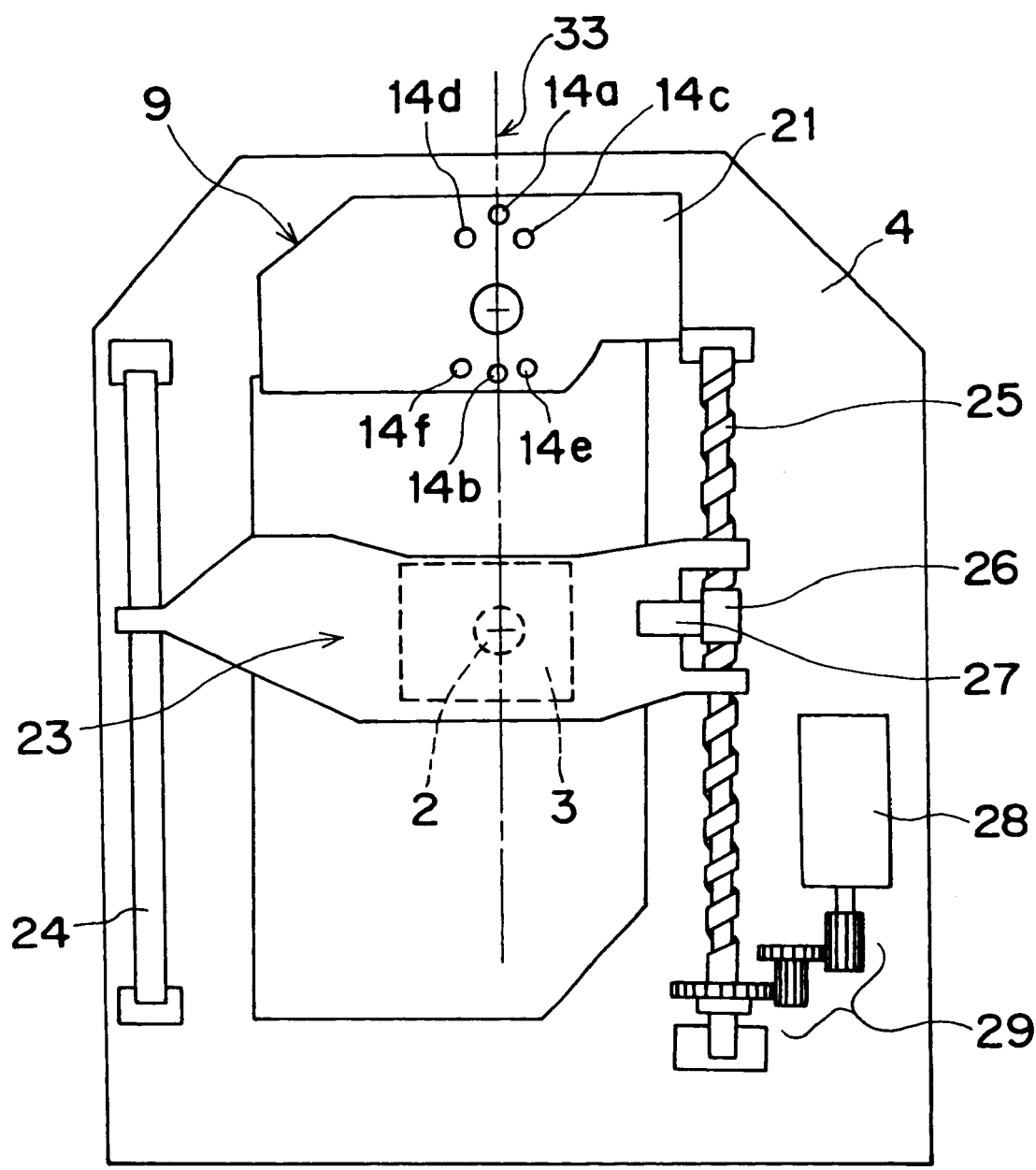
FIG. 4 is a bottom view of the optical disk apparatus according to the invention.

FIG. 4 is a bottom view of the unit holder 4 of the optical disk apparatus.

The spindle motor 9 is fixed to the unit holder 4 using set screws. In addition, the unit holder 4 has mounted thereon the head having the objective lens 2 and objective lens fine-adjustment drive device 3, and a travel drive device 23 for moving the head in the radial direction of the disk 8. The travel drive device 23 comprises a feed motor 28, a feed gear 29, a feed screw bar 25, a feed clutch 26, a pressurized spring 27, and a guide bar 24. The unit holder 4 is mounted on the mechanical base 6 that acts as an enclosure for the drive, via vibration-proof legs composed of an elastic member.

A basic operation of the optical disk apparatus is described. To load the disk 8 in the apparatus, a disk loading mechanism is used to allow the disk tray 5 to protrude from the front panel 7 and the disk 8 is then placed on the disk tray 5. The disk 8 on the disk tray 5 is fed into the apparatus using the disk loading mechanism. The disk 8 is fixed to the turn table 1 of the spindle motor 9 using magnetic attractive force provided by a disk-fixing clamper. Then, the disk 8 is started to rotate at a specified number of rotations by the spindle motor 9. Under this condition, an optical head located under the disk 8 is used to write and read information to and from the disk 8. The optical head includes the objective lens 2 and the objective lens fine-adjustment drive device 3 for driving the objective lens, and is moved in the radial direction of the disk 8 by the travel drive device 23 that moves in the radial direction of the disk 8, while being supported by the unit holder 4.

Figure 5:
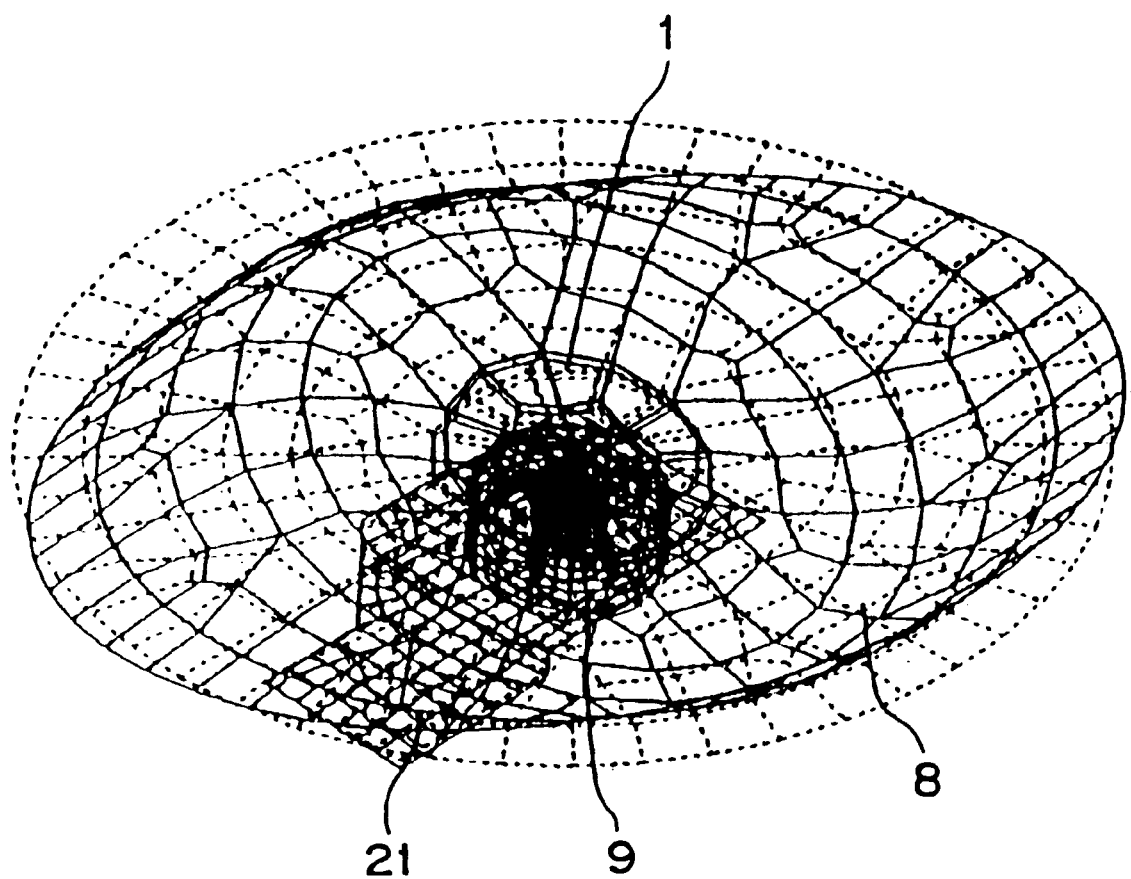
FIG. 5 shows vibrating modes of a disk used in the optical disk apparatus according to the invention.

FIG. 5 shows a basic vibration mode of the disk 8 that may cause an error during the recording and reproduction of information in the optical disk apparatus. The dotted line shows the mode before deformation and the solid line shows that after deformation. The disk 8 that is a recording medium for a CD, a CD-ROM, or a DVD-ROM that only reproduces data or a DVD-RAM that records and reproduces data has an outer diameter of 120 mm±0.3 mm and a board thickness of in a range from 1.2+0.3 mm to 1.2−0.1 mm and is generally made of polycarbonate. The disk 8 has a large number of natural resonance values in a low-frequency band (about 100 Hz to several-hundred Hz). Among these values, coupled vibration modes of a ring- and a diameter-node primary modes of the disk 8 shown in FIG. 5 have the largest variation of the relative position and inclination between the disk 8 and the objective lens 2, and is thus a major factor that degrades the vibration-resistance function of the optical disk apparatus.

Figure 6:
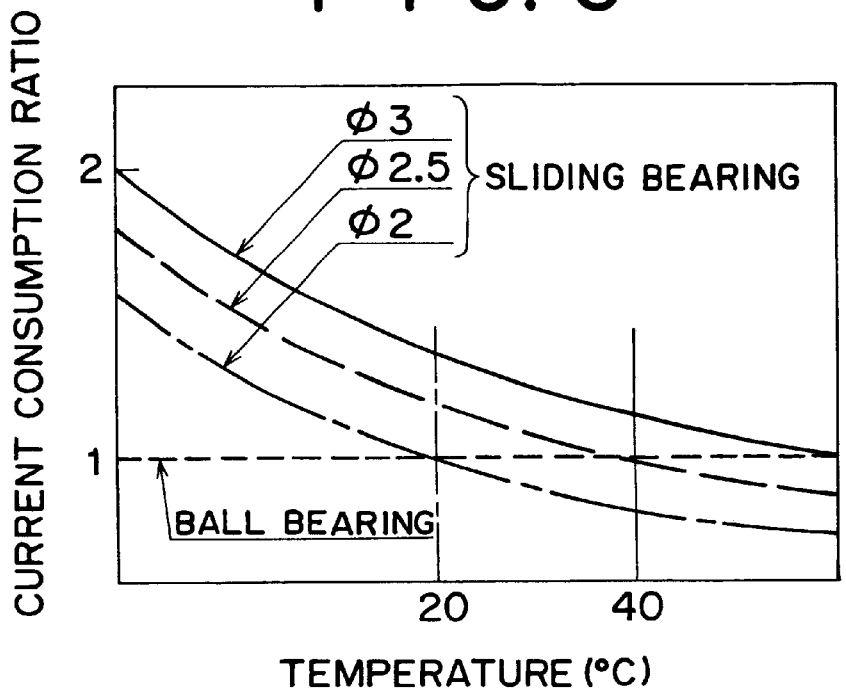
FIG. 6 is a characteristic graph showing the current consumption ratio with respect to temperature of spindle motors of the invention and the prior art.

FIG. 6 shows the relationship between the current consumption of the spindle motor 9 (reference) with a ball bearing with a shaft diameter of 3 mm, which has been used for optical disks, and the current consumption of another spindle motor 6 with he sliding bearing 17. The spindle motor 9 using the ball bearing with a shaft diameter of 3 mm has few changes in current consumption at usual working temperatures and consumes less currents than the spindle motor 9 that uses the sliding bearing 17 with a shaft diameter of 3 mm, as shown in FIG. 6. The spindle motor 9 using the sliding bearing 17 that uses oil as a lubricant is being now mainly used for disk apparatuses in view of rotational accuracy in high speeds, so it is important to reduce the power consumption of the spindle motor 9 that uses the sliding bearing 17. To solve this problem, it is effective to thin the shaft diameter. By thinning the shaft diameter of the sliding bearing 17 from 3 mm to 2.5 or 2 mm, the current consumption ratio of the spindle motor 9 can be significantly reduced as shown in FIG. 6. Thus, in the spindle motor 9 using the sliding bearing 17, it is desirable to make the shaft diameter 2.5 mm or less.

When, however, the shaft diameter is reduced, the rigidity may also be reduced, causing problems of vibrations of the disk 8 and shaft 11 itself.

Figure 7:
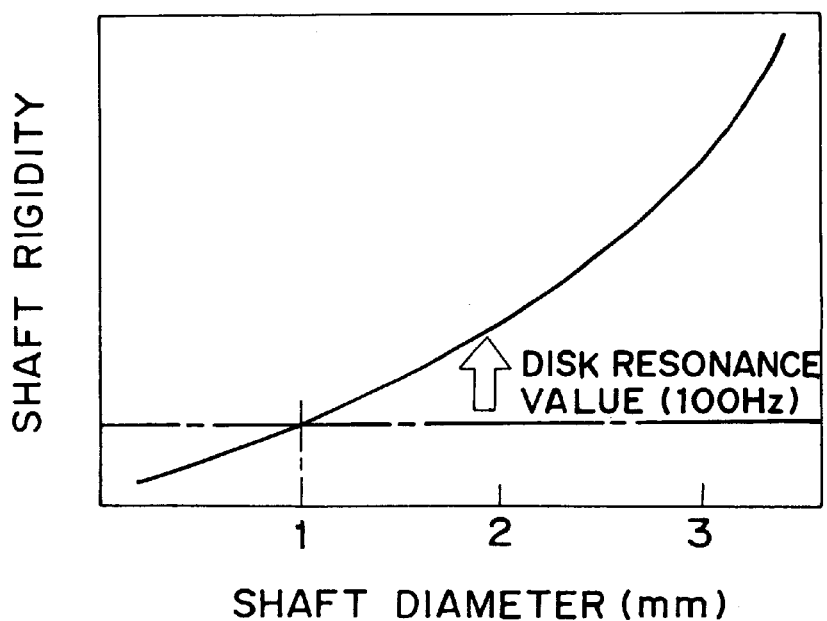
FIG. 7 is a characteristic graph showing shaft rigidity to shaft diameter of the spindle motor of the invention.

FIG. 7 shows the relationship between the shaft rigidity of the spindle motor 9 using the sliding bearing 17 and the shaft diameter. The shaft rigidity means the bending of the shaft or torsional resonance, and when the shaft rigidity is low, it resonates with disk 8, thereby degrading the vibration-resistance performance of the disk apparatus. As described above, the disk 8 has a large number of natural frequency values between about 100 Hz and several-hundred Hz and particularly around 100 Hz has natural modes such as the ring-node primary mode. Thus, when the shaft rigidity of the spindle motor 9 exists around 100 Hz, it may resonate with the natural mode of the disk. Therefore, the shaft rigidity must exist at 100 Hz or more. That is, it is desirable to make the shaft diameter to 1 mm or more, as shown in the figure.

As described above, in the spindle motor 9 using the sliding bearing 17, in view of the current consumption and shaft rigidity in FIGS. 6 and 7, the current consumption can be reduced and the vibration of natural resonance value such as the ring-node primary mode is prevented when the shaft has a shaft diameter between 1 and 2.5 mm. The disk 8 in this embodiment is used for a DVD or a CD-ROM, has an outer diameter of 120 mm, and is made of polycarbonate, and the natural values of the disk vary with its material or overall size. For example, when the overall size of the disk is reduced, the natural value of the disk increases while its mass decreases, thereby increasing the shaft rigidity. Furthermore, the inertia force of the disk decreases to reduce the power consumption of the spindle motor. On the contrary, when the overall size of the disk is increased, the natural value of the disk decreases while its mass increases, thereby reducing the shaft rigidity by an amount of mass increment. The power consumption also increases by an amount of inertia force increment. If the material of the disk is changed to glass or aluminum, the shaft rigidity and power consumption also vary in the same way. In this case, the above described shaft diameter range also varies.

Figure 8A:
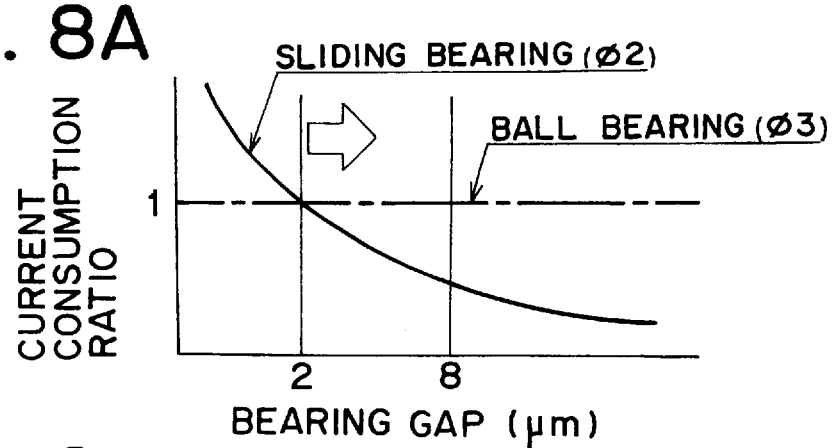
FIGS. 8A and 8B are characteristic graphs showing the current consumption ratio to bearing gap and the shaft rigidity to bearing gap of the spindle motor of the invention.

FIG. 8A shows the relationship between the current consumption and the bearing gap of the spindle motor 9 (reference) with a ball bearing with a shaft diameter of 3 mm, which has been used for optical disks, and of another spindle motor 6 with the sliding bearing 17 with a shaft diameter of 2 mm. As can be seen from the graph, the current consumption of the sliding bearing 17 with a shaft diameter of 2 mm increases with decreasing the gap of the bearing, and the gap of the bearing is desirably set at 2 μm or more to maintain the current consumption almost the same as that of the ball bearing with the shaft diameter of 3 mm.

Figure 8B:
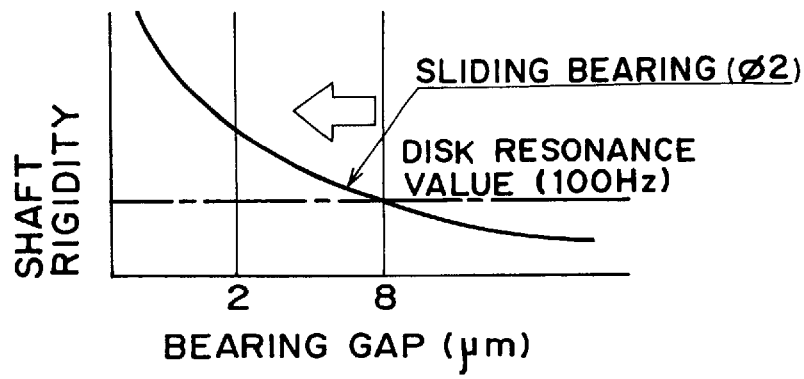

FIG. 8B shows the relationship between the bearing gap of the spindle motor 9 using the sliding bearing 17 with a shaft diameter of 2 mm and its shaft rigidity. As can be seen from the graph, the shaft rigidity decreases with increasing bearing gap. In order to shift the shaft rigidity from the natural resonance value 100 Hz of the disk 8 in the ring-node primary mode, it is desirable to make the bearing gap 8 μm or less.

As described above, in the spindle motor 9 using the sliding bearing 17, in view of the current consumption and shaft rigidity in FIG. 8, the current consumption can be reduced and the vibration of natural resonance value such as the ring-node primary mode of the disk is prevented when the bearing gap is between 2 and 8 µm. The bearing gap is most desirably about 4 µm when processing accuracy and mass-productivity are also taken into consideration.

Figure 9:
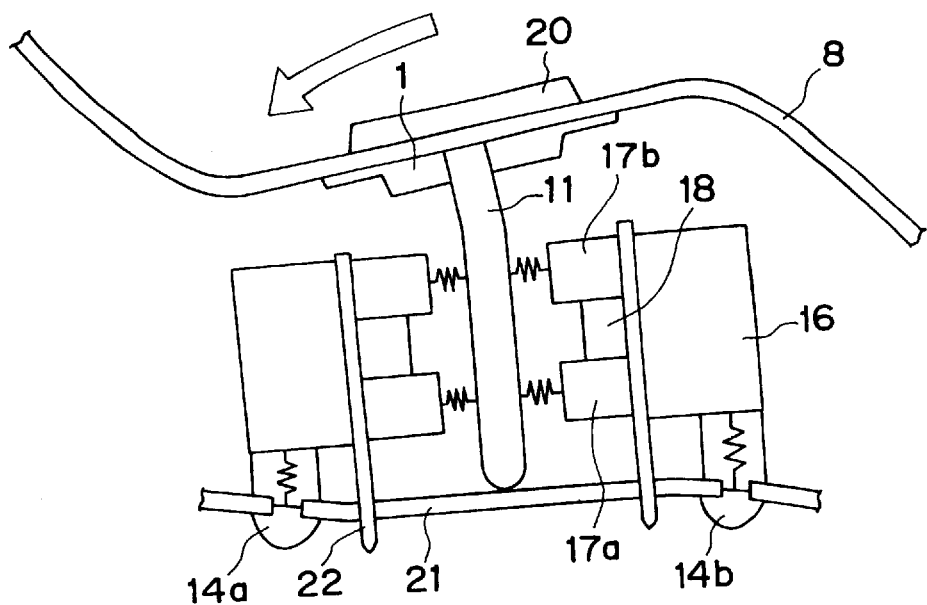
FIG. 9 is a vibrating mode model illustration of the spindle motor of the invention.

FIG. 9 is a model drawing of the spindle motor 9 during the vibrating mode of the disk 8. On this model, it is assumed that the disk 8, turn table 1, shaft 11, and damper 20 are fixed and that a spring element is provided between the shaft 11 and two bearings 17a and 17b. In addition, the sliding bearings 17a, 17b, felt metal 18, bearing housing 22, and stator core 16 are each fixed. Part of the bearing housing 22 is caulked and fixed to the stator substrate 21.

When the disk 8 vibrates in the coupled vibrating mode of the ring- and diameter-node primary modes, for example, the disk 8 itself is deformed and a falling moment acts on the spindle shaft 11, as shown in FIG. 9. On account of the moment the shaft 11 is bent and deformed, causing the bearings 17a, 17b and the bearing housing 22, which constitute fixed portions, to fall. Accompanying with the fall down of the fixed portions, a bending moment occurs also in the stator substrate 21. In addition, the vibration of the disk 8 is transmitted through the spindle motor 9 to the unit holder 4, the travel drive device 23, and the objective lens 2 in the head 2.

According to the embodiment of the present invention, since the lubricant 10 is interposed between the shaft 11 and sliding bearing 17 in the bearing housing 22, it is possible to assume that spring elements are provided between the shaft 11 and the bearing 17 as shown in FIG. 9 and thus it is possible to damp vibration energy from the disk 8.

According to the embodiment of the present invention, since the damping materials 14 are interposed between the fixed portion and stator section of the motor 9, it is possible to assume that spring elements are provided between the fixed portion and stator section of the motor 9 as shown in FIG. 9. Since the stator section is perfectly restrained by the apparatus body, vibration energy from the disk 8 can be damped within the transmission path to the apparatus body. Owing to the structure in which the legs of the plurality of damping embers 14 interposed between the fixed portion and stator section of the motor are positioned on a circle centered at the rotating center of the motor 9, an amount of damping of the vibration energy can be adjusted by the number, size, or material of the legs of the damping members 14.

Furthermore, according to the embodiment of the present invention, since the damping members 14 are provided so that one side of them that is closer to the line 33 joining the motor 9 with the head and a larger rigidity than the other side, an action to prevent the disk 8 from falling toward the head as shown in FIG. 9 acts and an action to damp the vibration energy from the disk 8 can be maintained. Thus, errors in recording and reproduction in the disk apparatus can be significantly reduced. Errors in recording and reproduction in the disk apparatus can further be reduced by disposing the legs of the plurality of damping members 14 on the circle centered at the rotating center of the motor 9 and symmetrical to and near the line joining the rotating center of the motor 9 with the objective lens in the head that is used to record and reproduce data on and from the disk 8.

Figure 10A:
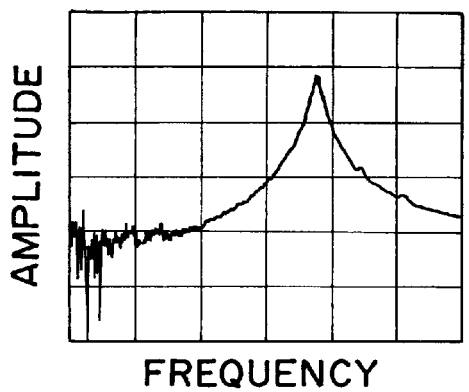
FIGS. 10A to 10C are graphs showing frequency characteristics in a shaft falling down direction of the spindle motor of the invention.
Figure 10B:
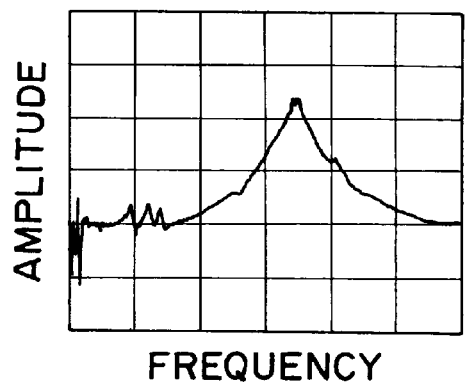
Figure 10C:
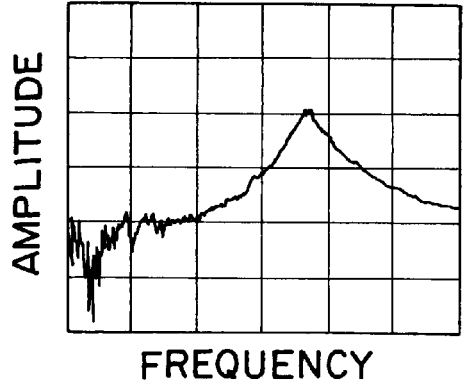

FIGS. 10A to 10C show frequency characteristics in which the vibration of the shaft 11 in the direction in which it falls is evaluated as a transfer function when the disk 8 is mounted on a conventional spindle motor and the spindle motor 9 of the invention and they are horizontally vibrated from the outside. The peak of each frequency characteristic in FIGS. 10A to 10C is the natural value of the disk 8 in the coupled vibrating mode of the ring- and diameter-node primary modes. FIG. 10A shows the frequency characteristic of a conventional spindle motor that uses a ball bearing without damping members and also shows a significantly high peak value. Fig. 10B shows the frequency characteristic of the spindle motor 9 of the invention that uses the sliding bearing 17 without damping members and also shows a lower peak value than in FIG. 10A. FIG. 10C shows the frequency characteristic of the spindle motor of the invention that uses the sliding bearing 17 with the damping members 14 and also shows a lower peak value than in FIG. 10B. This reduction effect is produced by the damping of the vibration of the disk provided by both the sliding bearing and the damping members according to the invention.

Figure 11:
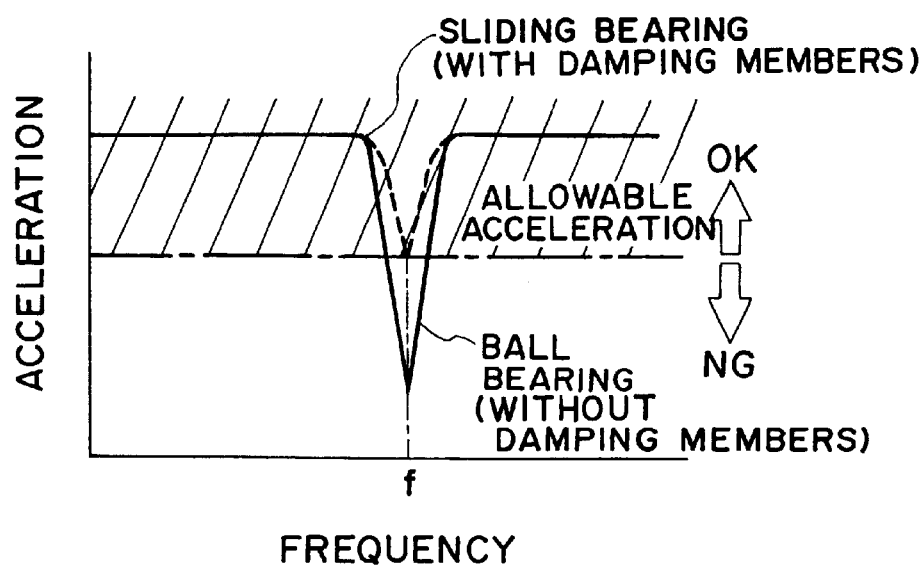
FIG. 11 is a graph showing the vibration-resistance performance of the spindle motor of the invention.

FIG. 11 is an acceleration characteristic chart based on the evaluation of the vibration-resistance performance of the conventional optical disk apparatus and the optical disk apparatus of the invention. The evaluation of the vibration-resistance performance is conducted under the condition in which a certain allowable acceleration level is determined and a vibrating force is applied to the optical disk device in an information read out state with frequency of the vibrating force varied. If a read error occurs below the allowable acceleration level, the spindle motor is evaluated as NG. In FIG. 11, (f) indicates a natural value of the disk 8 in the coupled vibration mode of the ring- and diameter-node primary modes. At this frequency, the vibration-resistance performance of the conventional spindle motor using a ball bearing without damping members is lower than the allowable acceleration level as shown by the continuous line. On the contrary, the vibration-resistance performance of the spindle motor 9 using the sliding bearing 17 with the damping members 14 of the invention is within the allowable acceleration level as shown by the dashed line. This is due to the damping effect produced by both the lubricant 10 in the sliding bearing 17 and the damping members 14 as well as the rigidity increased by the damping members 14 to prevent the disk from falling toward the head.

Figure 12:
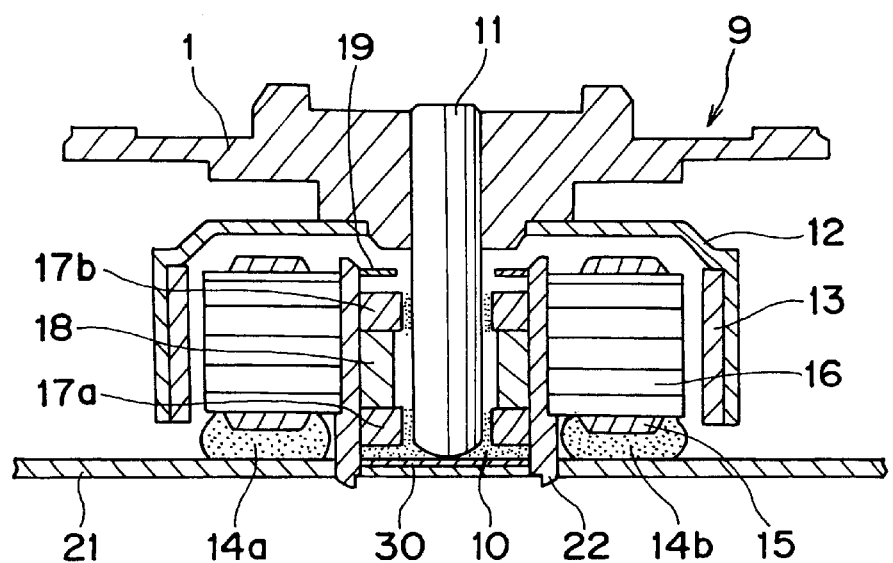
FIG. 12 is a vertical cross sectional view of another embodiment of the spindle motor of the invention.

FIG. 12 is a vertical cross sectional view of another embodiment of the spindle motor 9 according to the invention. Elastic members 14a, 14b are injected or sandwiched between the stator core 16 and the stator substrate 21. This configuration prevents the spindle motor 9 from falling when the disk 8 is in its vibrating mode and damps vibrating energy. The elastic members 14 comprises, for example, gal, silicon rubber, or resin. This embodiment enables the elastic members to be mounted without changing the configuration of the conventional spindle motor and also enables the material to be easily changed as required.

Figure 13:
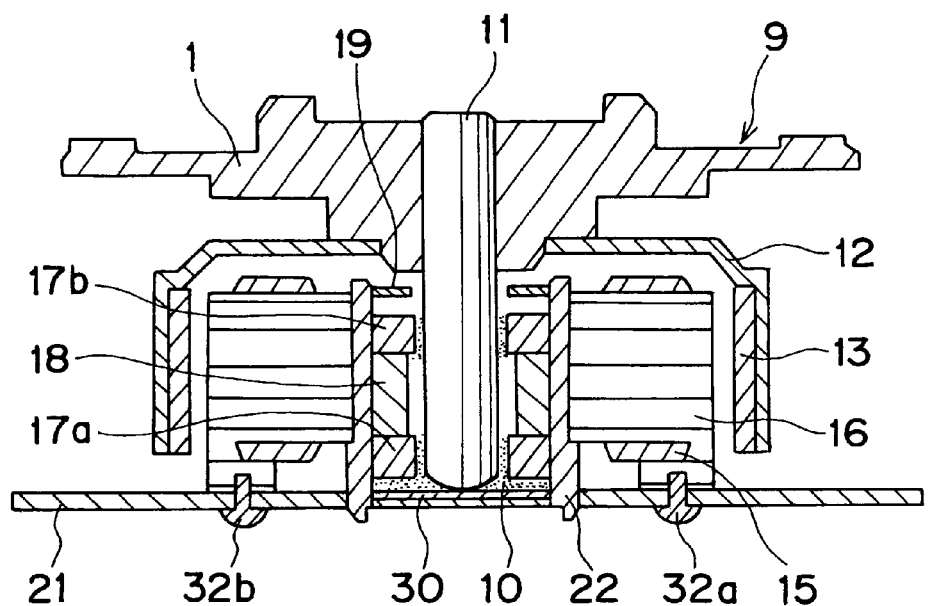
FIG. 13 is a vertical cross sectional view of yet another embodiment of the spindle motor of the invention.

FIG. 13 is a vertical cross sectional view of yet another embodiment of the spindle motor 9 according to the invention. An extended end of the stator core 16 is fixed to the stator substrate 21 by means of, for example, set screws 32a, 32b. This embodiment gives priority to the increase in rigidity that serves to prevent the motor from falling toward the head instead of the damping effect.

Figure 14:
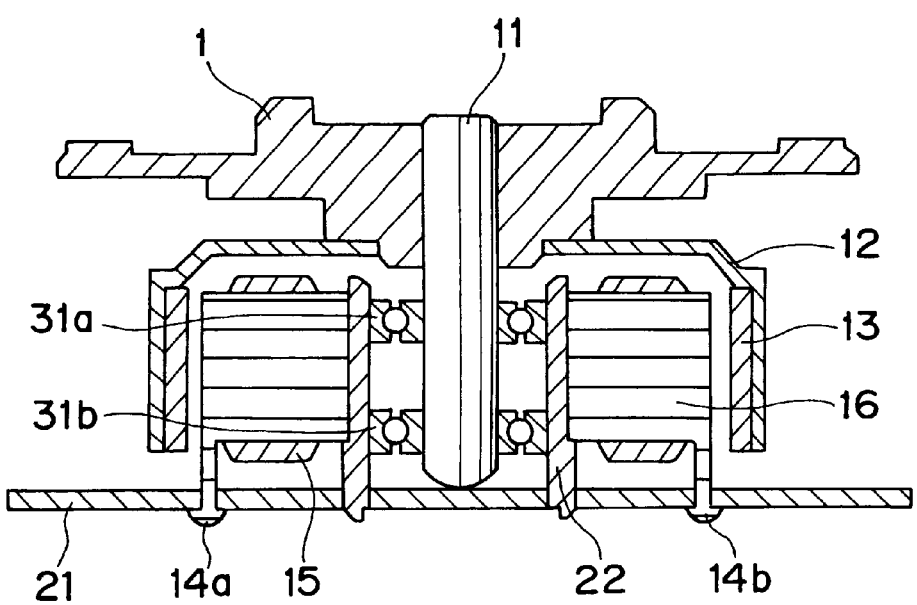
FIG. 14 is a vertical cross sectional view of still another embodiment of the spindle motor of the invention.

FIG. 14 is a vertical cross sectional view of another embodiment of the spindle motor 9 that is the invention. The bearing of this spindle motor 9 comprises two ball bearings 31a, 31b, but the damping members 14a, 14b are configured in the same manner as in FIG. 1 in order to produce the above effects. By using the ball bearings, it is possible to use the apparatus in a harsh environment in which temperature greatly varies.

Although the invention has been described in conjunction with the optical disk apparatus cited as an example, it can be of course applied to an HDD using a magnetic head and a magnetic disk and the like.

According to the invention, it is possible to consider that a spring element is provided between the shaft 11 and the bearing 17 and thus vibration energy from the disk 8 is damped. Further, it is possible to consider that a spring element is provided between the stator section and the apparatus body and also with this structure the vibration energy from the disk 8 is damped. Since the damping members 14 are provided in such a way that one side of them that is closer to a line 33 joining the motor 9 with the objective lens in the head has a higher rigidity than the other side, an action to prevent the disk 8 from falling toward the head acts and an action to damp the vibration energy from the disk 8 is maintained. Thus, errors in recording or reproduction in the disk apparatus can be significantly reduced.

What is claimed is:

1. A disk apparatus comprising a motor for rotating a disk and a head for recording and reproducing data on and from said disk wherein said motor is mounted on said disk apparatus through a plurality of elastic damping members arranged on or near an imaginary straight line joining a rotating center of said motor with an objective lens of said head, wherein at least one of said plurality of elastic damping members is arranged on or near the imaginary straight line joining the rotating center of said motor with the objective lens of said head and is disposed between the rotary center of said motor and the objective lens of said head, wherein said plurality of elastic damping members are mounted with respect to a stator section of said motor so as to substantially isolate the objective lens of said head from forces applied to said motor, and wherein said plurality of elastic damping members are arranged within an angle of ±45° from the imaginary straight line joining the rotating center of said motor with the objective lens with an apex of the angle at the rotating center and measured from the imaginary straight line at the rotating center in directions toward the objective lens and away from the objective lens.

2. A disk apparatus according to claim 1, wherein said motor comprises a rotating portion and a fixed portion, said rotating portion of said motor comprising a rotor, a shaft, and means for holding said disk, said fixed portion of said motor comprising a bearing section in which a bearing is provided in a bearing housing and said stator section in which a stator core having a stator coil is mounted in said bearing housing, said shaft being inserted into and supported by said bearing, said stator section being mounted in the disk apparatus via said plurality of elastic damping members.

3. A disk apparatus according to claim 1, wherein said motor comprises a rotating portion and a fixed portion, said rotating portion of said motor having means for holding said disk, said fixed portion of said motor having a bearing section and said stator section mounted in the disk apparatus said via plurality of elastic damping members.

4. A disk apparatus according to claim 1, wherein said motor comprises a rotating portion and a fixed portion, said rotating portion of said motor having means for holding said disk, said fixed portion of said motor having a bearing section and said stator section mounted in the disk apparatus via said plurality of elastic damping members provided in such a way that one side of said plurality of elastic damping members which is closer to the imaginary straight line joining said motor with the objective lens has a higher rigidity than the other side of said plurality of elastic damping members.

5. A disk apparatus according to claim 1, wherein said motor comprises a rotating portion and a fixed portion, said rotating portion of said motor comprising a rotor, a shaft and means for holding said disk, said fixed portion of said motor comprising a bearing section in which a bearing is provided in a bearing housing and said stator section in which a stator core having a stator coil is mounted in said bearing housing, said shaft being inserted into and supported by said bearing, and wherein legs of the plurality of elastic damping members are interposed between said stator section and the apparatus body so as to be located on a circle centered at a rotating center of said motor, said elastic damping members being provided symmetrically and in proximity to the imaginary straight line joining the rotating center of the motor with the objective lens in said head that is used to record and reproduce data on and from said disk.

6. A disk apparatus according to claim 1, wherein said disk comprises a polycarbonate disk of about 120 mm diameter and said motor comprises a rotating portion and a fixed portion, said rotating portion of said motor comprising a rotor, a shaft and means for holding said disk, said fixed portion of said motor comprising a bearing section in which a sliding bearing is provided in a bearing housing and said stator section in which a stator core having a stator coil is mounted in said bearing housing, said shaft being inserted into and supported by said sliding bearing and having a shaft diameter of 1 mm or more and 2.5 mm or less, said stator section being mounted in the disk apparatus via said plurality of elastic damping members.

7. A disk apparatus according to claim 1, wherein said disk comprises a polycarbonate disk of about 120 mm diameter and said motor comprises a rotating portion and a fixed portion, said rotating portion of said motor comprising a rotor, a shaft and means for holding said disk, said fixed portion of said motor comprising a bearing section in which a sliding bearing is provided in a bearing housing and said stator section in which a stator core having a stator coil is mounted in said bearing housing, said shaft being inserted into and supported by said sliding bearing with a gap between said shaft and said sliding bearing of 2 $\mu$m or more and 8 $\mu$m or less, said stator section being mounted in the disk apparatus via said plurality of elastic damping members.

8. A disk apparatus according to claim 1, wherein said motor comprises a spindle motor for rotating a disk and wherein said motor comprises rotating portion and a fixed portion, said rotating portion of said motor comprising a rotor including a multipolar permanent magnet, a shaft and a turn table for holding said disk, said fixed portion of said motor comprising cylindrical bearing housing, a sliding bearing installed in said bearing housing in such a way that the bearing is divided into two parts positioned up and down, a stator core mounted on an outer circumference of said bearing housing and a stator coil provided in said stator core, a lower end of said bearing housing being mounted on a substrate, said shaft being inserted into and supported by said sliding bearing, a lubricant being interposed between said shaft and sliding bearing in said bearing housing, and wherein the plurality of elastic damping members are interposed between said stator section and the apparatus body so that legs of the damping members are located on a circle centered at a rotating center of said motor, the elastic damping members being provided symmetrically and in proximity to the straight line joining the imaginary rotating center of the motor with the objective lens, for recording and reproducing data on and from said disk.

9. A disk apparatus comprising a motor for rotating a polycarbonate disk of about 120 mm diameter and a head for recording and reproducing data on and from said disk wherein said motor comprises a rotating portion and a fixed portion, said rotating portion of said motor comprising a rotor, a shaft and means for holding said disk, said fixed portion of said motor comprising a bearing section in which a sliding bearing is provided in a bearing housing and a stator section in which a stator core having a stator coil is mounted in said bearing housing, said shaft being inserted into and supported by said sliding bearing and having a shaft diameter of 1 mm or more and 2.5 mm or less, a gap between said shaft and said sliding bearing being 2 $\mu$m or more and 8 $\mu$m or less, said motor being mounted on said disk apparatus through elastic damping members arranged on or near an imaginary straight line joining a rotating center of said motor with an objective lens of said head, wherein at least one of said elastic damping members is arranged on or near the imaginary straight line joining the rotating center of said motor with the objective lens of said head and is disposed between the rotary center of said motor and the objective lens of said head, wherein said plurality of elastic damping members are mounted with respect to said stator section of said motor so as to substantially isolate the objective lens of said head from forces applied to said motor, and wherein said plurality of elastic damping members are arranged within an angle of ±45° from the imaginary straight line joining the rotating center of said motor with the objective lens with an apex of the angle at the rotating center and measured from the imaginary straight line at the rotating center in directions toward the objective lens and away from the objective lens.

10. A motor for a disk apparatus having a rotating portion and a fixed portion, said rotating portion having means for holding a disk, said fixed portion having a bearing section and a stator section mounted on a substrate via elastic damping members arranged on or near an imaginary straight line joining a rotating center of said motor with an objective lens of said head, said elastic damping members being provided in such a way that one side of said elastic damping members which is closer to the imaginary straight line which is perpendicular to a rotating shaft of said rotating portion has a higher rigidity than the other side of said elastic damping members, and wherein at least one of said elastic damping members is arranged on or near the imaginary straight line joining the rotating center of said motor with the objective lens of said head and is disposed between the rotary center of said motor and the objective lens of said head, wherein said plurality of elastic damping members are mounted with respect to said stator section of said motor so as to substantially isolate the objective lens of said head from forces applied to said motor, and wherein said plurality of elastic damping members are arranged within an angle of ±45° from the imaginary straight line joining the rotating center of said motor with the objective lens with an apex of the angle at the rotating center and measured from the imaginary straight line at the rotating center in directions toward the objective lens and away from the objective lens.

11. A motor according to claim 10, wherein said rotating portion comprises a rotor including a multipolar permanent magnet, a shaft and a disk, said fixed portion comprising a cylindrical bearing housing, a sliding bearing installed in said bearing housing in such a way that the bearing is divided into two parts positioned up and down, a stator core mounted on an outer circumference of said bearing housing and a stator coil provided in said stator core, a lower end of said bearing housing being mounted on a substrate, said shaft being inserted into and supported by said sliding bearing, a lubricant being interposed between said shaft and sliding bearing in said bearing housing, and wherein a plurality of damping members are interposed between said stator section and the substrate so that legs of the damping members are located on a circle centered at a rotating center of said rotating portion, the damping members being provided symmetrically and in proximity to the imaginary straight line.

* * * * *